United States Patent [19]

Bowman

[11] Patent Number: 4,508,385
[45] Date of Patent: Apr. 2, 1985

[54] SEAT TRACK ASSEMBLY

[75] Inventor: James A. Bowman, Georgetown, Ky.

[73] Assignee: Hoover Universal, Inc., Ann Arbor, Mich.

[21] Appl. No.: 366,451

[22] Filed: Apr. 7, 1982

[51] Int. Cl.³ ............................................. B60N 1/04
[52] U.S. Cl. .................................... 297/341; 248/429
[58] Field of Search ............... 248/430, 429, 407, 393; 74/527, 536; 403/108, 107, 324; 297/379, 341

[56] References Cited

U.S. PATENT DOCUMENTS

| | | | |
|---|---|---|---|
| 2,723,711 | 11/1955 | Duncan | 248/429 |
| 3,286,971 | 11/1966 | Walter et al. | 248/429 |
| 3,602,245 | 8/1971 | Meisel | 74/527 |
| 3,940,182 | 2/1976 | Tamura | 297/341 |
| 4,101,169 | 7/1978 | Muraishi et al. | 297/341 |
| 4,265,144 | 5/1981 | Clark | 74/527 |
| 4,384,701 | 5/1983 | Barley | 248/393 |
| 4,422,690 | 12/1983 | Kopich | 297/379 |

FOREIGN PATENT DOCUMENTS

| | | | |
|---|---|---|---|
| 2443514 | 3/1976 | Fed. Rep. of Germany | 297/341 |
| 22763 | of 1895 | United Kingdom | 248/429 |

Primary Examiner—William E. Lyddane
Assistant Examiner—Mark W. Binder
Attorney, Agent, or Firm—Stephenson and Boller

[57] ABSTRACT

A vehicle seat track assembly comprising a lower frame member secured to the vehicle floor, an upper frame member secured to the seat and slidably supported on the lower frame member for relative movement fore and aft of the vehicle and a seat position control member supported on the frame members for movement in transverse directions among three positions: a locked position, in which the seat position control member is secured to both of the frame members to prevent relative movement thereof, an indexing position, in which the seat position control member is locked to the upper frame member but movable relative to the lower frame member so that the seat can be adjusted to discrete positions according to the desire of the user, and a slide position, in which the seat position control member is locked to the lower frame member but not to the upper frame member so that the seat can be slid forwardly a specified distance to facilitate passenger access to the back seat and then rearwardly to the previously adjusted position.

5 Claims, 9 Drawing Figures

U.S. Patent   Apr. 2, 1985   Sheet 1 of 3   4,508,385
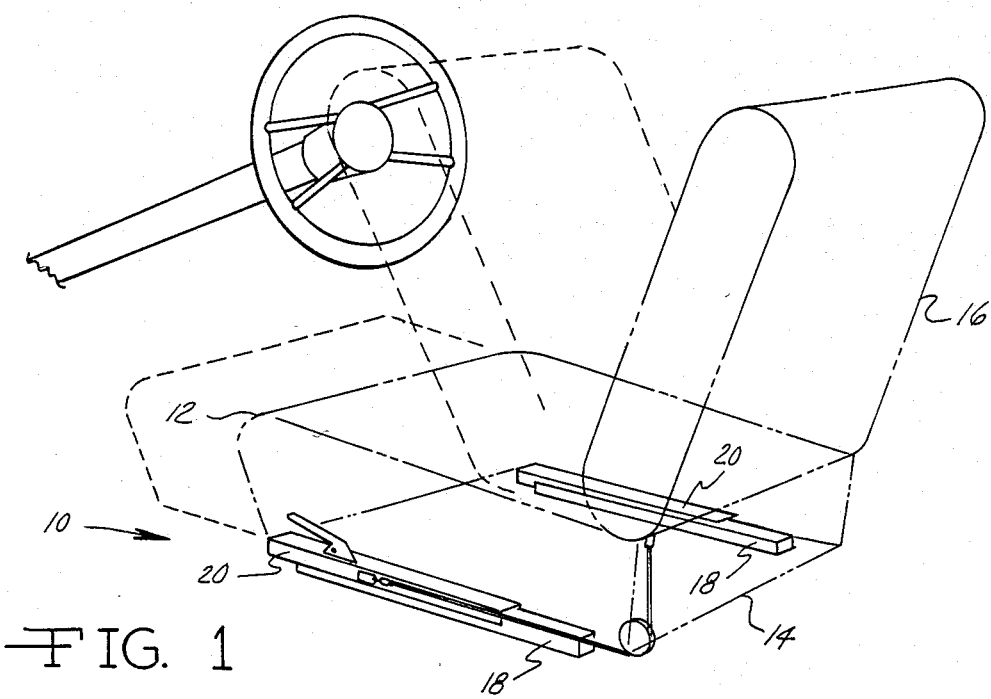
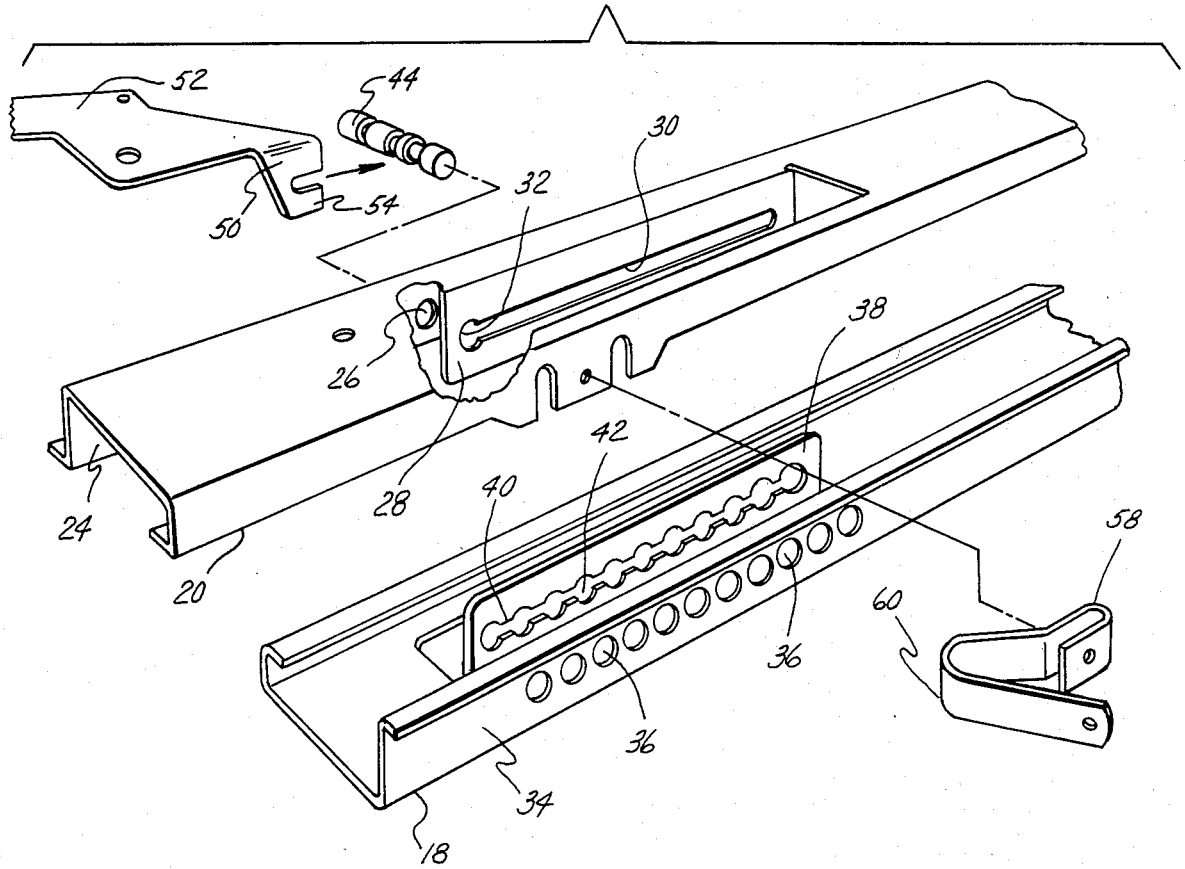

SEAT TRACK ASSEMBLY

BACKGROUND OF THE INVENTION

This invention relates generally to seat slide structures for vehicle seats in which the position of the seat relative to the steering wheel or dashboard can be adjusted. Structures of this type commonly provide a pair of frame members, one secured to the vehicle seat and the other secured to the vehicle floor, which are movable relative to each other in directions fore and aft of the vehicle. Typically, a pin or other abutment means is provided so that the two frame members can be secured together, the pin or abutment means being removable to allow the seat position to be adjusted. This arrangement has generally been satisfactory from the standpoint of strength of attachment and ease of adjustment to the user of the seat. However, when these devices are used in two-door vehicles, it is difficult for passengers to gain access to the back seat. Usually, the seat back is merely tilted forward, which provides little space between the seat bottom and the back seat. The seat can be moved to its furthest forward position to allow more space, but this forces the user to readjust the seat after the back seat passengers have entered the vehicle.

It is an object of the present invention, therefore, to provide an improved device for adjusting the position of the seat fore and aft of the vehicle in which the seat can be slid forwardly to facilitate entry of back seat passengers and subsequently moved rearwardly to a previously adjusted position.

Another object is to provide a seat track assembly for adjusting and sliding a vehicle seat which is of relatively simple construction, is inexpensive to produce and assemble, and is easy for vehicle users to operate. It is a further object of this invention to provide a seat track assembly which, when locked, provides firm resistance to forces tending to move the seat fore and aft of the vehicle.

SUMMARY OF THE INVENTION

The present invention provides a seat track assembly particularly adapted for use on a front seat in a two-door vehicle. The seat track assembly comprises a lower frame member secured to the vehicle floor, an upper frame member secured to the vehicle seat and supported on the lower frame member for relative movement fore and aft of the vehicle, and a seat position control member supported on the frame members for movement in transverse directions among a "locked" position, in which the seat position control member is secured to both of the frame members to thereby prevent relative movement of the frame members, an "indexing" position, in which the seat position control member is secured to the upper frame member but not to the lower frame member so that the seat position can be adjusted, and a "slide" position in which the seat position control member is secured to the lower frame member but not to the upper frame member so that the seat can be slid forwardly to facilitate access to the back seat and subsequently moved rearwardly to a previously adjusted position.

Each of the upper and lower frame members includes a side wall having a plurality of longitudinally spaced openings formed therein. The upper frame member has a first bracket extending downwardly therefrom having a slot formed therein and an opening at one end of the slot. The lower frame member has a second bracket extending upwardly therefrom having a slot formed therein and a plurality of longitudinally spaced openings along the slot. Each of the openings in the frame members and the brackets has a diameter which is greater than the width of the slots in the brackets. The seat position control member has large diameter sections and small diameter sections. The large diameter sections are adapted to be received in the openings on the frame members and the brackets but are too large to fit in the bracket slots.

When the seat position control member is in the locked position, large diameter sections are received into openings on both of the side walls and both of the brackets. This prevents movement of the upper and lower frame members, and holds the seat in position. In this position, contact between the frame members and the seat position control member occurs at four points. Thus, the seat is held securely to the vehicle floor, and fore and aft movement is prevented even in the presence of extreme forces such as might be experienced in a crash.

When the seat position control member is in the indexing position, large diameter sections are received in the opening in the first bracket and in one of the openings in the upper frame side wall, while a small diameter section is received into the slot on the second bracket. The seat position control member is thus locked to the upper frame member and can be moved with the upper frame member relative to the lower frame member among discrete positions corresponding to the openings in the second bracket. In this manner, the position of the seat relative to the steering column or the dashboard can be adjusted. When a desired position is achieved, the seat position control member is moved back into the locked position.

When the seat position control member is in the slide position, large diameter sections are received into one of the openings in the second bracket and one of the openings in the lower frame side wall, while a small diameter section is received into the slot on the first bracket. The upper frame member and thus the seat can then slide fore and aft of the vehicle confined only by the limits of the slot, while the seat position control member remains fixed to the lower frame member at a position previously adjusted by the driver or front seat passenger. When slid fully forwardly, a large space is provided between the front seat and the back seat, which facilitates passenger entry to the back seat. After passenger entry, the seat can be slid rearwardly to its previously adjusted position. No further adjustment by the driver or front seat passenger is required.

The seat position control member is moved in transverse directions between its locked, indexing and slide positions by means of a cam member having an end portion adapted to engage the seat position control member. The cam member is actuated by a lever which is rotatably mounted on the upper frame member for rotation about a vertical axis and is operable by the driver or front seat passenger. To move the seat position control member from the locked position to the indexing position, the lever is moved in one direction (for example, away from the driver) until a small diameter section of the position control member is contained in the slot on the second bracket. To move the position control member from the locked position to the slide position, the lever is moved in the opposite direction (for example, toward the driver) until a small diameter section of the seat position control member is contained in the slot on the first bracket. Movement of the seat position control member among its three positions is therefore easily accomplished by vehicle users.

The seat track assembly further includes an abutment member which is secured to the upper frame member and is also remotely connected to the seat back. The abutment member contacts the seat position control member and prevents it from moving into the slide position. When the seat back is tilted forward, however, the abutment member is removed from contact with the seat position control member, allowing it to move into the slide position. In order to slide the seat forwardly, therefore, it is first necessary to tilt the seat back forward. This prevents the seat from being accidentally slid forwardly while it is being occupied.

The seat track assembly of this invention is inexpensive to manufacture, assemble and use. The number of parts is kept at a minimum, and each part is easily manufactured through conventional processes. The assembly is easy to operate, and provides firm, safe support of the seat on the vehicle floor.

Further objects, features and advantages of this invention will become apparent, and the invention will be more fully understood, from a consideration of the following description, the accompanying drawings, and the appended claims.

BRIEF DESCRIPTION OF THE DRAWINGS

FIG. 1 is a perspective view of the seat track assembly of this invention shown in assembly relation with a vehicle seat showing the seat in a locked position in solid lines and in a forwardly slid position in broken lines;

FIG. 2 is a blown-apart perspective view of the seat track assembly of this invention, with portions of the upper frame member thereof broken away for purposes of clarity;

DESCRIPTION OF THE INVENTION

Figure 3:
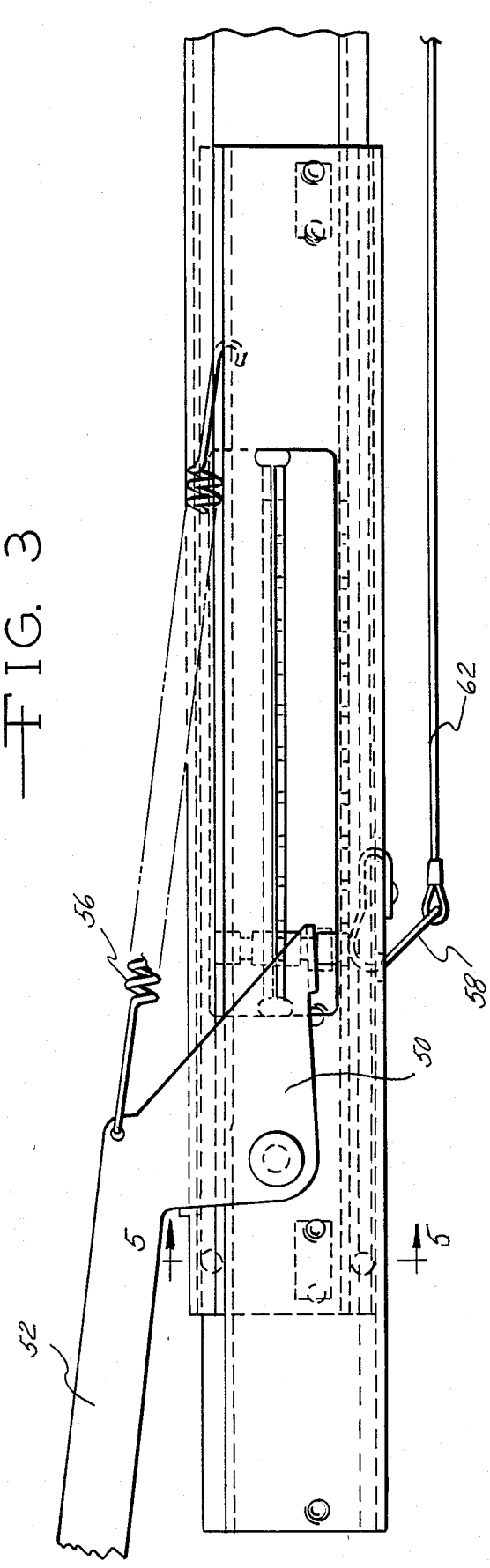
FIG. 3 is a top view of the seat track assembly.
Figure 4:
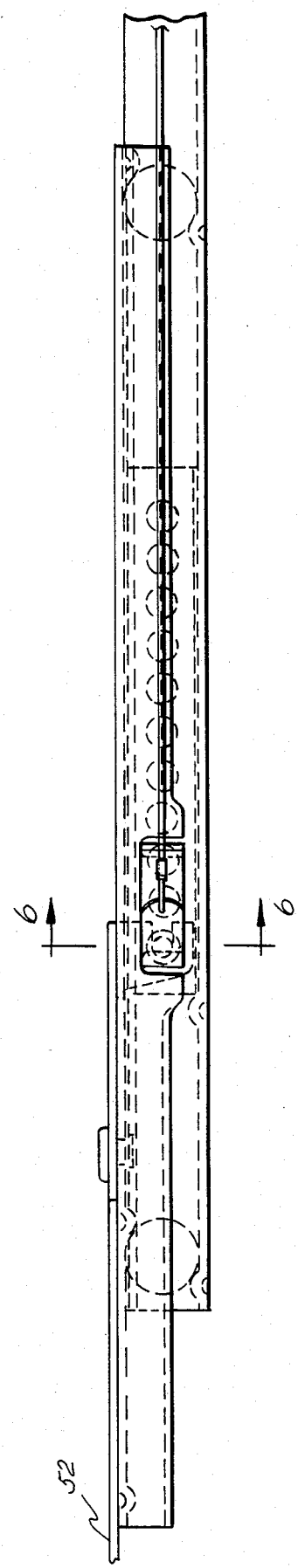
FIG. 4 is a side view of the seat track assembly.

The seat track assembly of this invention, indicated generally at 10 in the drawings, is shown in FIG. 1 adapted for use on a vehicle seat 12. The seat 12 has a base or bottom section 14 and a tiltable back 16. The seat track assembly 10 is particularly adapted to be used with the driver's seat and the front passenger seat of a two-door vehicle. The seat 12 depicted in FIG. 1 is the driver's seat. Hereinafter, although the terminology used will refer to the seat 12 as the driver's seat, it is to be understood that the assembly 10 is adaptable for use with the front passenger's seat, and in practice will be used with both front seats.

Figure 5:
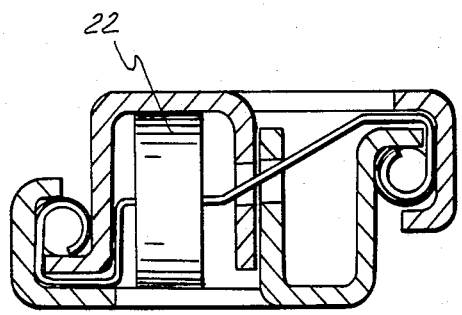
FIG. 5 is a transverse sectional view of the seat track assembly, as seen from substantially the line 5—5 in FIG. 3.

The seat track assembly 10 includes a lower frame member 18, which is secured to the vehicle floor, and an upper frame member 20, which is secured to the seat base 14. The upper frame member 20 is mounted on the lower frame member 18 by means of a bearing assembly 22 (FIG. 5) so that the frame member 20 and thus the seat 12 are movable relative to the vehicle floor in directions fore and aft of the vehicle. Frame members 18 and 20 are provided on each side of the seat base 14, although the remaining components of the assembly 10 are provided only on the side of the seat 12 which faces the vehicle door.

Figure 6:
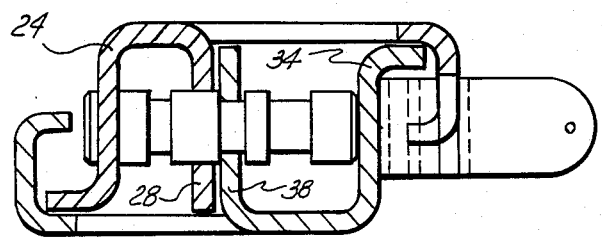
FIG. 6 is a transverse sectional view of the seat track assembly, as seen from substantially the line 6—6 in FIG. 4.

As seen in FIG. 2, the upper frame member 20 has a substantially inverted U-shaped cross section, and has a side wall 24 in which a plurality of longitudinally spaced openings 26 (only one of which is shown) are provided. A first bracket 28 extends downwardly from the top of the frame member 20. The bracket 28 may be separately formed and secured to the frame member 20 such as by welding, or it may be formed integrally with the frame member 20 such as by molding or by bending downward a portion of the frame member 20. A slot 30 is formed in the first bracket 28, and an opening 32 is provided at one end of the slot 30. The slot 30 and the opening 32 are vertically alignable with the openings 26 in the side wall 24. The lower frame member 18 has a substantially U-shaped cross section and has a side wall 34 in which a plurality of longitudinally spaced openings 36 are provided. A second bracket 38 extends upwardly from the bottom of the frame member 18. The second bracket 38 is formed in a fashion similar to the first bracket 28. A slot 40 is formed in the second bracket 38, and a plurality of longitudinally spaced openings 42 are provided along the length of the slot 40. The openings 42 correspond positionally to the openings 36 in the lower frame side wall 34. When the upper frame member 20 is mounted on the lower frame member 18, as seen in FIG. 6, the assembly 10 provides four surfaces which extend substantially parallel to each other: the upper frame side wall 24, the first bracket 28, the second bracket 38, and the lower frame side wall 34.

Figure 7:
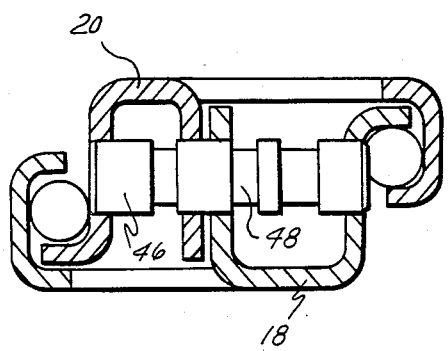
FIG. 7 is a transverse sectional view showing the seat position control member in the locked position.
Figure 8:
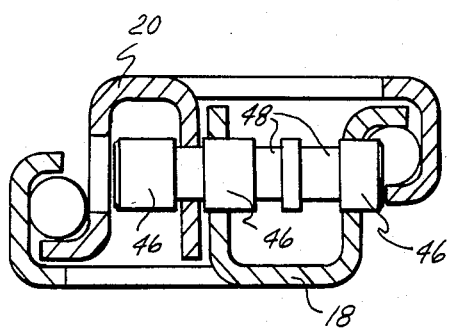
FIG. 8 is a transverse sectional view showing the seat position control member in the slide position.
Figure 9:
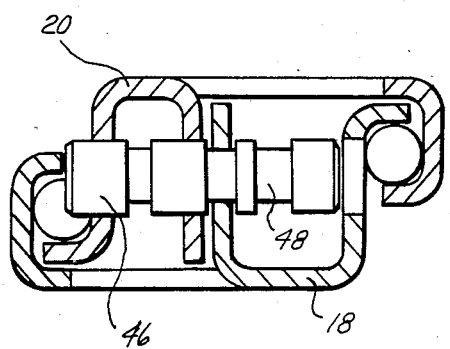
FIG. 9 is a transverse sectional view showing the seat position control member in the indexing position.

The assembly 10 further includes a seat position control member 44 which is mounted on the frame members 18 and 20 for movement in directions transversely thereof. The seat position control member 44 has alternating large diameter sections 46 and small diameter sections 48, as seen in FIGS. 7-9. The large diameter sections 46 are adapted to fit into the openings 26, 32, 36 and 42, but not the slots 30 and 40. The small diameter sections 48 are adapted to fit into the slots and the openings. As will be explained more fully hereinafter, the seat position control member 44 is movable in transverse directions among three positions: a locked position in which it is secured to both the frame member 20 and the frame member 18, an indexing position in which the seat position control member 44 is secured to the upper frame member 20 but not to the lower frame member 18 and is movable within the slot 40, and a slide position in which the seat position control member 44 is secured to the lower frame member 18 but not to the upper frame member 20 and is movable within the slot 30.

As seen in FIG. 7, when the seat position control member 44 is in the locked position, large diameter sections 46 are received into one of the openings 26 in the upper frame side wall 24, the opening 32 in the slot 30, one of the openings 42 in the slot 40, and one of the openings 36 in the lower frame side wall 34. In this position, the seat position control member 44 is incapable of movement within the slots 30 and 40, and is fixed relative to both the upper and lower frame members 18 and 20. Thus, relative movement of the upper and lower frame members 18 and 20 is prevented, and the seat 12 is locked to the vehicle floor. Contact between the frame member and the seat position control member is established at four points, and since such contact is made at the large diameter sections of the seat position control member, the arrangement ensures firm resistance to forces tending to cause the seat 12 to move fore and aft of the vehicle.

FIG. 9 shows the seat position control member 44 in its indexing position, moved to the left from its FIG. 7 locked position. In the indexing position, the opening 32 on the first bracket 28 and the opening 26 corresponding thereto on the upper frame side wall 24 each receive large diameter sections of the seat position control member 44. Thus, the seat position control member 44 is fixed with respect to the upper frame member 20. A small diameter section 48 on the seat position control member 44 is received into the slot 40 on the second bracket 38, and the seat position control member 44 is free from association with any of the openings 36 in the lower frame member side wall 34. The upper frame member 20 is therefore movable relative to to the lower frame member 18. As the upper frame member 20 moves fore and aft of the vehicle, the seat position control member 44 moves within the slot 40 on the second bracket 38. In this manner, the seat position control member 44 can be moved from one of the openings 42 to another opening 42 until a desired position of the seat 12 with respect to the vehicle steering wheel or dashboard is reached. The seat position control member 44 can then be moved back into its locked position to thereby secure the seat 12 in the adjusted position.

FIG. 8 shows the seat position control member 44 in its slide position, moved to the right from its FIG. 7 locked position. In the slide position, one of the openings 36 on the lower frame side wall 34 and one of the openings 42 in the second bracket 38, namely, the openings 36 and 42 corresponding to the previously adjusted location of the seat 12, receive large diameter sections of the seat position control member 44. The seat position control member 44 is thus secured to the lower frame member 18. A small diameter section of the seat position control member 44 is received into the slot 30 on the first bracket 32, and the seat position control member 44 is free from contact with the upper frame side wall 24. The seat position control member 44 is therefore movable within the slot 30. In other words, the upper frame member 20 is movable in fore and aft directions relative to the lower frame member 18 while the seat position control member 44 remains in its previously adjusted position. The movement of the upper frame member 20 is restricted only by the end points of the slot 30. That is, the seat 12 is slidable forwardly a distance substantially equal to the length of the slot 30. When the seat 12 is slid fully forwardly, a large space is provided between the seat base 14 and the back seat of the vehicle, thereby facilitating passenger entry to the back seat. When the seat 12 is subsequently moved rearwardly, it automatically returns to its previously adjusted position as determined by the location of the seat position control member 44. The member 44 is eventually contacted by the front end point of the slot 30. At this point, the seat position control member 44 may be returned to its locked position.

With reference now to FIG. 2, it is seen that the seat position control member 44 is moved in transverse directions by means of a cam 50 actuated by a lever 52 which is operable by the driver. The cam 50 has a forked end portion 54 which is operable to engage the seat position control member 44 at one of the small diameter sections 48 thereof. As seen in FIG. 3, the lever 52 is mounted on the upper frame member 20 for rotation about a vertical axis. When the lever 52 is pulled toward the driver, the seat position control member is moved away from the driver, that is, toward its slide position. When the lever 52 is pushed away from the driver, the seat position control member 44 is moved toward the driver, that is, toward its indexing position. A spring member 56 having one end secured to the lever 52 and another end secured to the upper frame member 20 urges the lever 52 toward the driver.

The assembly 10 further includes an abutment member 58 which is secured to the upper frame member 20 and is remotely connected to the seat back 16. As seen in FIGS. 2 and 3, the abutment member 58 has a torsion bar 60 which contacts the lower frame side wall 34, and prevents the seat position control member 44 from moving into its slide position when the seat back 16 is tilted back. The abutment member 58 is connected to the seat back 16 through a wire 62. When the seat back 16 is tilted forward, the torsion bar 60 of the abutment member 58 is removed from contact with the lower frame member side wall 34 and the spring member 56 moves the seat position control member 44 into the slide position. Thus, a person desiring to gain entry to the back seat merely tilts the seat back forward and pushes the seat forward. When the seat back 16 is not tilted forward, the spring member 56 and the abutment member 58 exert opposing forces on the seat position control member 44 and hold it in the locked position. Since the seat position control member is moved away from the abutment member 58 in moving it to the indexing position, it is not necessary to tilt the seat back 16 forward to adjust the seat. It is possible for the driver to overcome the force of the abutment member 58 by pulling the lever 52. The seat 12 can therefore be slid forwardly and backwardly even while the driver is in the seat and the seat back is not tilted forwardly. The frame members 18 and 20 and the mechanism which includes the control member 44, lever 52 and member 58 can thus be selectively operated to place the members and mechanism in an "easy access mode" (FIG. 8) to facilitate access to the area to the rear of seat 12, an "adjust mode" (FIG. 9), in which the seat 12 is adjustable fore and aft of the vehicle, and a "locked mode" (FIG. 7) in which the position of the seat 12 is fixed in the vehicle.

The assembly 10 is adaptable to seats 12 in which the back 16 is movable among a variety of angles of tilt between an extreme forward and extreme rearward tilt. By selecting an appropriate length for the wire 62, the abutment member 58 can be made to deactivate only when the seat back 16 is tilted to its extreme forward position. At intermediate degrees of tilt, the wire 62 remains slack. Thus, the driver is free to adjust the degree of tilt of the seat back 16 without moving the seat position control member 44 to the slide position.

The seat track assembly 10 of this invention performs the functions performed by conventional seat slide structures. The assembly 10 provides for adjustment of the tilt of the seat back and adjustment of the fore and aft position of the seat base, according to the desires of the driver. Additional functions are performed by the assembly 10 as well. The seat base can be slid forwardly to facilitate passenger entry to the back seat, and subsequently returned to its previously adjusted position. Thus, the driver need not readjust the seat position every time passengers use the back seat. These functions are performed with little input required of the vehicle users. The seat is indexed simply by turning a lever, and is slid merely by tilting the seat back forwardly. The assembly 10 is also of simple construction and is lightweight and inexpensive.

What is claimed is:

1. A seat track assembly comprising an upper frame member adapted to be secured to a vehicle seat, a lower frame member adapted to be secured to the vehicle floor, said upper frame member being supported on said lower frame member for relative movement fore and aft of the vehicle, a first bracket on said upper frame member having a slot formed therein and an opening at one end of said slot, a second bracket on said lower frame member having a slot formed therein and a plurality of longitudinally spaced openings along said slot, said openings in said brackets having diameters substantially greater than the width of said slots, and a seat position control member supported on said frame members for movement in transverse directions between a locked position in which said seat position control member is secured to both said upper and lower frame members to prevent relative movement thereof, an indexing position in which said seat position control member is secured to said upper frame member but not to said lower frame member for relative movement to discrete positions with respect to said lower frame member, and a slide position in which said seat position control member is secured to said bottom frame member but not to said top frame member for relative movement of said top frame member on said bottom frame member within specified limits, said seat position control member having large diameter sections and small diameter sections, said large diameter sections being adapted to fit into said openings but not said slots, so that when said seat position control member is in said locked position, large diameter sections are received into openings on both said first and second bracket member, when said seat position control member is in said indexing position, a large diameter section is received into the opening on said first bracket member and a small diameter section is received into said slot on said second bracket member, and when said seat position control member is in said slide position, a large diameter section is received into one of the openings on said second bracket member and a small diameter section is received into the slot on said first bracket member.

2. The seat track assembly according to claim 1, wherein each of said upper and lower frame members has a side wall provided with a plurality of longitudinally spaced openings so that when said seat position control member is in said locked position a large diameter section is received into one of the openings on each of said upper and lower side walls, when said seat position control member is in said indexing position a large diameter section is received into one of the openings on said upper frame side wall, and when said seat position control member is in said slide position a large diameter section is received into one of the openings on said lower frame side wall.

3. The seat track assembly according to claim 2, further including means for moving said seat position control member in transverse directions comprising a cam member pivotally mounted on said upper frame member for movement about a vertical axis, said cam member having an end portion adapted to engage said seat position control member.

4. The seat track assembly according to claim 3, further including an abutment member secured to said upper frame member operable to abut said seat position control member and thereby prevent said seat position control member from moving into said slide position, and means connecting said abutment member to the vehicle seat back so that when said seat back is tilted forward, said abutment member is removed from abutment with said seat position control member.

5. The seat track assembly according to claim 3, further including spring means operable to urge said cam member and thus said seat position control member toward said locked position.

* * * * *